United States Patent
Bumann et al.

(10) Patent No.: US 9,040,135 B2
(45) Date of Patent: May 26, 2015

(54) POLYPHENYLSULFONE-POLYTETRA-FLUOROETHYLENE BLEND FOR ANTI-WEAR TAPES IN FLEXIBLE OIL PIPES

(75) Inventors: Detlef Bumann, Alsbach-Haehnlein (DE); Albert Drexler, Hoechst/Odw. (DE); Ricardo Luiz Willemann, Shanghai (CN)

(73) Assignee: Evonik Röhm GmbH, Darmstadt (DE)

( * ) Notice: Subject to any disclaimer, the term of this patent is extended or adjusted under 35 U.S.C. 154(b) by 0 days.

(21) Appl. No.: 13/883,711

(22) PCT Filed: Dec. 1, 2011

(86) PCT No.: PCT/EP2011/071453
§ 371 (c)(1),
(2), (4) Date: May 6, 2013

(87) PCT Pub. No.: WO2012/095214
PCT Pub. Date: Jul. 19, 2012

(65) Prior Publication Data
US 2013/0230677 A1    Sep. 5, 2013

(30) Foreign Application Priority Data

Jan. 14, 2011   (DE) .......................... 10 2011 002 687

(51) Int. Cl.
| | |
|---|---|
| B32B 1/08 | (2006.01) |
| B29C 47/00 | (2006.01) |
| C08L 81/06 | (2006.01) |

(Continued)

(52) U.S. Cl.
CPC ............. B29C 47/0004 (2013.01); C08L 81/06 (2013.01); C08J 3/20 (2013.01); C08J 2381/06 (2013.01); C08J 2427/18 (2013.01); B29C 47/0045 (2013.01); F16L 57/06 (2013.01)

(58) Field of Classification Search
CPC .................................. B32B 1/08; C08L 81/06
USPC .................... 428/34.1, 34.2, 35.9, 36.9, 35.7; 264/239
See application file for complete search history.

(56) References Cited

U.S. PATENT DOCUMENTS

| | | | |
|---|---|---|---|
| 3,981,945 A | * | 9/1976 | Attwood et al. ............... 525/137 |
| 5,244,975 A | | 9/1993 | Asai et al. ..................... 525/189 |

(Continued)

FOREIGN PATENT DOCUMENTS

| | | |
|---|---|---|
| EP | 0 444 589 | 9/1991 |
| GB | 2 441 066 | 2/2008 |
| WO | 2011 006706 | 1/2011 |

OTHER PUBLICATIONS

"Algoflon L & Polymist PTFE Micropowders," Retrieved from the Internet: URL:http://www.solvayplastics.com/sites/solvayplastics/EN/specialty_polymers/FullyFluorinatedPolymers/Pages/Algoflon_Polymist Micropowders%20PTFE.aspx (retrieved on May 11, 2012) the whole document, (Jan. 31, 2012) XP 55027004.

(Continued)

*Primary Examiner* — Marc Patterson
(74) *Attorney, Agent, or Firm* — Oblon, McClelland, Maier & Neustadt, L.L.P.

(57) ABSTRACT

The invention relates to an improved blend of polyphenylsulfone (PPSU) and polytetrafluoroethylene (PTFE) for producing friction-reducing tapes (anti-wear tapes) used as a friction-reducing intermediate layer in flexible fluid pipes, e.g. oil pipes.

7 Claims, 1 Drawing Sheet

Figure 1:
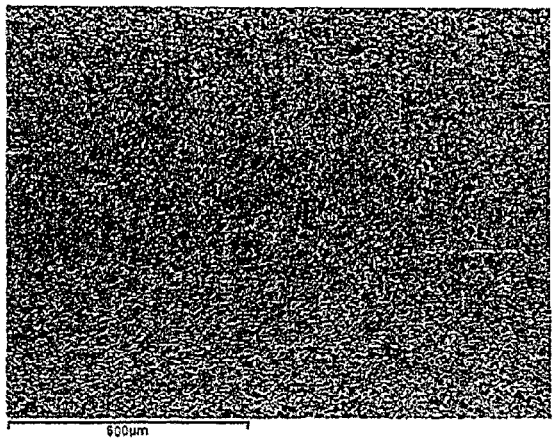
Figure 1:
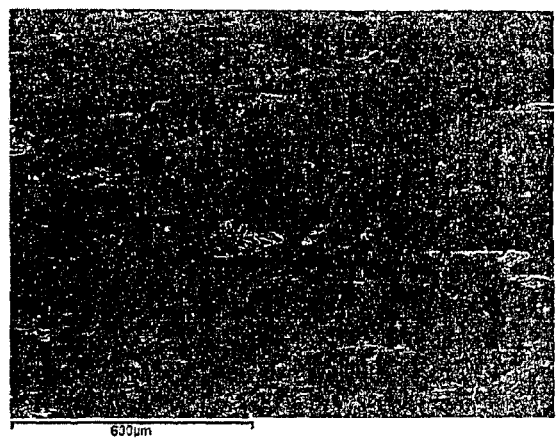

(51) Int. Cl.
*C08J 3/20* (2006.01)
*F16L 57/06* (2006.01)
*B32B 23/00* (2006.01)

(56) References Cited

U.S. PATENT DOCUMENTS

| | | | |
|---|---|---|---|
| 5,709,944 A * | 1/1998 | Kokumai et al. | 428/402 |
| 5,916,958 A * | 6/1999 | Kelly et al. | 524/497 |
| 6,582,628 B2 * | 6/2003 | Kondo et al. | 252/511 |
| 2008/0190507 A1 | 8/2008 | Hardy | 138/114 |
| 2012/0114890 A1 | 5/2012 | Bumann et al. | 428/36.9 |

OTHER PUBLICATIONS

International Search Report Issued May 24, 2012 in PCT/EP11/71453 Filed Dec. 1, 2011.
U.S. Appl. No. 13/800,348, filed Mar. 13, 2013, Parusel, et al.
Patent Examination Report No. 1, issued Feb. 23, 2015 in Australian Patent Application No. 2011355261.
Zonyle® MP 1300Technical Information, retrieved from internet on Feb. 23, 2015. <URL: http//www2.dupont.com/Teflon_Industrial/en_US/assets/downloads/h07813.pdf.

* cited by examiner

POLYPHENYLSULFONE-POLYTETRAFLUOROETHYLENE BLEND FOR ANTI-WEAR TAPES IN FLEXIBLE OIL PIPES

FIELD OF THE INVENTION

The invention relates to an improved mixture made of polyphenyl sulphone (PPSU) and polytetrafluoroethylene (PTFE) for producing friction-reducing tapes which are used as friction-reducing interlay for flexible fluid pipes, examples being oil-conveying pipes (anti-wear tapes).

PRIOR ART

GB 2 441 066 (Technip France) describes a flexible tube of multilayer structure for transporting hydrocarbons. Between the metal strips, which are movable with respect to one another at least to some extent, the arrangement has a friction-reducing plastics strip, and the said plastics strip is composed of an amorphous polymer with a glass transition temperature of from 175 degrees C. to 255 degrees C. The strip is composed of polyphenyl sulphone (PPSU) and of a perfluorinated polymer and of a polyether ether ketone (PEEK). In one specific embodiment of the invention, a mixture made of 85% of polyphenyl sulphone (PPSU) is mixed with 15% of polytetrafluoroethylene (PTFE) and extruded to give strips of thickness 1.5 mm and width about 1 m. Nothing is said about the molecular weights of the plastics used.

US 2005/0229991 describes an arrangement similar to that in GB '066, but in this case the material of the intermediate layer is an elastomeric thermoplastic polymer, for example a styrene-butadiene-styrene rubber (SBS), a styrene-ethylene-butadiene-styrene copolymer (SEBS) or an EPDM (ethylene-propylene-diene) copolymer, or else a polybutadiene, a polyisoprene or a polyethylene-butylene copolymer.

The German patent application DE102009027659.9 discloses PTFE-containing PPSUs with a proportion of from 1 to 15% by weight of PTFE, particularly preferably from 5 to 10% by weight. However, it has been found that compositions of this type in the stated ranges have very variable mechanical properties. DE102009027659.9 moreover does not indicate how the extrusion process could be optimized in order to improve mechanical properties.

OBJECT

In the light of the prior art discussed, it was therefore an object to find a material and/or a mixture of materials which can be used for the friction-reducing tapes in oil-conveying pipes and which has/have better suitability than the materials of the prior art for the conditions prevailing in that situation (temperatures of about 130° C., pressures of from 300 to 400 bar).

A particular object was to provide an improved process for producing friction-reducing tapes, comprising plastics mouldings made of polyphenyl sulphone (PPSU) and polytetrafluoroethylene (PTFE), where these have good and balanced mechanical properties, in particular in, but also perpendicularly to, the direction of extrusion.

ACHIEVEMENT OF OBJECT

The objects were achieved via an improved process for producing plastics products made of polyphenyl sulphone (PPSU) and polytetrafluoroethylene (PTFE). It was found here that particularly balanced mechanical properties not only in but also perpendicularly to the direction of extrusion can be provided if particularly fine dispersion of the PTFE particles in the PPSU matrix is ensured. A surprisingly simple process has been developed, giving the said fine dispersion of the PTFE, which is not miscible with PPSU.

Surprisingly, in particular in view of the teaching of DE102009027659.9, it has been found that fine dispersion of the PTFE within the PPSU is of particularly great importance in relation to the mechanical properties and to the durability of the said blends in the form of friction-reducing tapes in oil-conveying pipes. If dispersion is poor, relatively large PTFE phases form, and at the boundaries of these there is particularly impaired cohesion within the tape.

According to the invention, the term tapes hereinafter means preferred embodiments of the plastics mouldings.

With this, it has been found that only very uniform dispersion of a very fine-particle PTFE across the entire cross section within the PPSU matrix provides the desired effect over the usage period in which by way of example the thickness of the tape decreases, and provides particularly balanced mechanical properties not only in but also perpendicularly to the direction of extrusion.

The process according to the invention is in particular characterized in that
the PTFE content of the mixture is from 4.0% by weight to 6.0% by weight, preferably from 4.5% by weight to 5.5% by weight. The PPSU content is correspondingly from 94.0% by weight to 96.0% by weight, preferably from 95.5% by weight to 94.5% by weight.

It is moreover important that a very fine-grained PTFE is used. However, for reasons deriving from extrusion technology it is in turn necessary that dust content is not excessive.

A PTFE which has particular suitability for the process according to the invention is one which prior to the extrusion process has a proportion smaller than 12% by volume, preferably from 8 to 11% by volume, with a particle size smaller than 3 μm, and a proportion of at least 88% by volume, preferably at least 90% by volume, with a particle size smaller than 25 μm. A PTFE which is very particularly suitable is one which also has a specific surface area of from 1.5 to 3.0 $m^2/g$.

The particle sizes are determined by means of laser scattering using equipment from Microtrac. The specific surface area is determined by means of nitrogen adsorption.

The process according to the invention in particular moreover features mixing of the PTFE and of the PPSU at a temperature of from 340 to 390° C., preferably from 345 to 385° C., in a first extruder, and processing of the pellets obtained from the first extrusion process in a second extruder at a temperature of from 345 to 390° C., preferably from 375 to 390° C., to give plastics mouldings.

It is preferable that the first extrusion process to give the pellets, providing particularly fine dispersion of the PTFE within the PPSU, is carried out at an ambient pressure of from 500 to 700 mbar, at a rotation rate of from 220 to 270 $min^{-1}$, at a melt temperature of from 340 to 390° C., preferably from 375 to 390° C., and at a torque of from 50% to 80%, preferably from 60% to 75%, preferably in a twin-screw extruder.

Surprisingly, it has been found that PTFE can be extruded without decomposition at these high temperatures in the melting range of the PPSU.

The second extrusion step, the further processing to give a plastics moulding, generally involves an extrusion process in a single-screw extruder with a rotation rate of from 40 to 60 $min^{-1}$.

The present invention further provides the use of the mixture or the plastics mouldings, where these have been produced by the process according to the invention, for producing anti-wear tapes.

The present invention also in particular provides the use of the said anti-wear tapes in pipes for fluids. The said pipes feature particular durability and mechanical strength.

The polyphenyl sulphone (PPSU)

The PPSU used comprises a polyphenyl sulphone which is marketed by Solvay Advanced Polymers with trade mark RADEL® R, e.g. RADEL R 5000 nt.

The repeat unit of the polymer has the following formula:

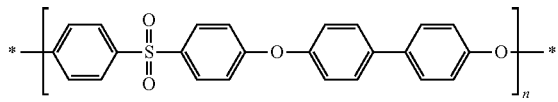

The material involved here is a transparent and high-performance plastic which has extremely high stress-cracking resistance and extremely high notched impact resistance, even after heat-ageing, and excellent chemicals resistance.

It is used for producing components in medical technology, in the chemical industry and in plumbing. The density of the polymer is 1.29 g/cm$^3$ measured to ISO 1183, yield stress is 70 MPa measured to ISO 527, elongation at break is 60% measured to ISO 527, tensile modulus of elasticity is 2340 MPa measured to ISO 527, Izod notched impact resistance at 23 degrees Celsius is 49.4 kJ/m$^2$ measured to ISO 180/1A, and Charpy notched impact resistance at 23 degrees Celsius is 58.3 kJ/m$^2$ measured to ISO 179/1eA.

Dielectric constant at 50 Hz is 3.4 measured to IEC 60250, dielectric constant at 1 MHz is 3.5 measured to IEC 60250, and dielectric loss factor at 50 Hz is $6*10^{-4}$ measured to IEC 60250. Dielectric loss factor at 1 MHz is $76*10^{-4}$ measured to IEC 60250, and dielectric strength is 15 kV/mm measured to IEC 60243-1, measured to ASTM. Thickness for dielectric strength is 3.2 mm, and specific volume resistivity to IEC 60093 is $9*10^{15}$ ohm m.

Longitudinal expansion along/perpendicularly to the direction of flow is $55*10^{-6}$/K measured to ISO 11359, melting point or glass transition temperature measured to ISO 11357 is 215 degrees Celsius, heat-deflection temperature A is 207 degrees Celsius measured to ISO 75 HDT/A (1.8 MPa), heat-deflection temperature B is 214 degrees Celsius measured to ISO 75 HDT/A (0.45 Mpa), maximum temperature (short-term) is 180 degrees Celsius, maximum temperature (long-term) is 160 degrees Celsius (heat-ageing to UL 746 (RTI) Mechanical W/O Imp., 40 000 h). Minimum usage temperature is minus 100 degrees Celsius.

The polytetrafluoroethylene (PTFE)

According to the invention, it is preferably necessary to use a polytetrafluoroethylene (PTFE) with a moderate molecular weight and with a small grain size, and also particularly with narrow grain size distribution. These PTFEs are particularly suitable for incorporation into engineering plastics, where these are processed at very high melt temperatures and have good mechanical properties, and also have high resistance to chemicals, such as mineral oils.

An example of a high-molecular-weight polytetrafluoroethylene (PTFE) used is very fine-grained Zonyl® MP 1300 polytetrafluoroethylene. This PTFE has particular suitability as additive in polymer mixtures based on HT thermoplastics.

EXAMPLES

Compounding Examples

A mixture made of from 95% by weight to 60% by weight of PPSU and from 40% by weight to 5% by weight of PTFE was compounded in the following manner:

The PPSU is melted and devolatilized in a twin-screw extruder (producer and type: Werner & Pfleiderer ZSK25 WLE (K4)), and the PTFE is introduced by way of a lateral feed aperture. The PPSU used comprised Radel R-5000 and the PTFE used comprised Zonyl MP 1300.

|  | Inventive Example 1 | Comparative Example 1 | Comparative Example 2 |
|---|---|---|---|
| PPSU (% by wt.) | 95 | 80 | 60 |
| PTFE (% by wt.) | 5 | 20 | 40 |
| Barrel temperature (° C.) | 380 | 380 | 380 |
| Rotation rate (rpm) | 250 | 250 | 250 |
| Torque | 62% | 36% | 37% |
| Vacuum (mbar abs.) | 600 | 600 | 600 |
| Melt pressure (bar) | 54 | 33 | 30 |

The compounded material obtained was pelletized.

The sheet according to the invention can be produced in a manner known per se via extrusion of the pellets obtained in the first step.

To this end, thermally plastified melt is produced by way of one extruder in the case of the simple extrusion process or by way of a plurality of extruders in the case of the coextrusion process, and is fed into an extrusion die. There can be additional apparatuses, e.g. a melt pump and/or a melt filter, arranged in a manner known per se between the extruder and extrusion die. The extruded webs can then be introduced into a polishing stack or into a calibrator.

The pellets were remelted and extruded to give tapes with the following dimensions: length 1 000 mm, width 150 mm and thickness 1.5 mm. Melt temperature was about 385 degrees Celsius.

Comparative Example 3

As Inventive Example 1, with rotation rate of 200 min$^{-1}$. The torque here was so high that uniform extrusion became impossible.

Comparative Example 4

As Inventive Example 1, with extrusion temperature of 320° C. Phase separation was discernible in the resultant pellets, even with the naked eye.

Extrusion Process

The pellets resulting from Inventive Example 1, and also from Comparative Examples 1 and 2, are extruded at 380° C. to give a tape. In the drawings, FIGS. 1 to 4, the differences in terms of phase separation between blends produced according to the invention and blends produced not according to the invention are apparent.

The blends resulting from the first extrusion process were studied microscopically in order to determine the respective microphase separation present. To this end, measurements were made by SEM/EDS in each case. SEM is Scanning Electron Microscopy. EDS is Energy Dispersive X-ray Spectroscopy. Both measurements were made on the surface of the pellets. In each case, the SEM measurements are depicted on the right-hand side.

Figure 2:
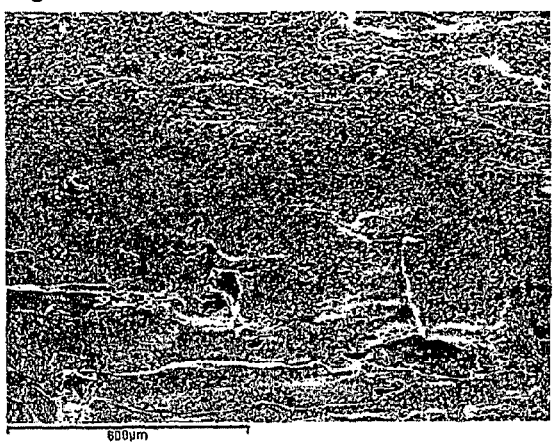
Figure 2:
Figure 3:
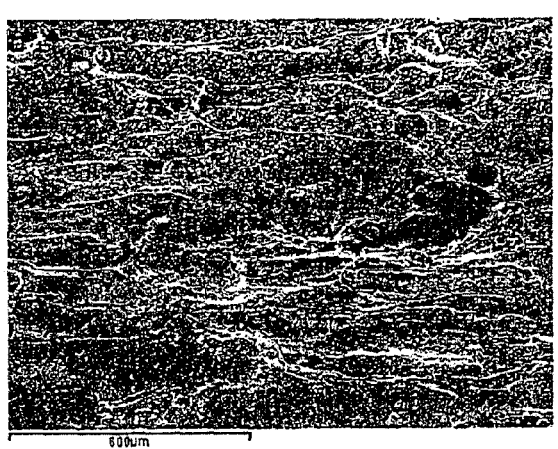
Figure 3:
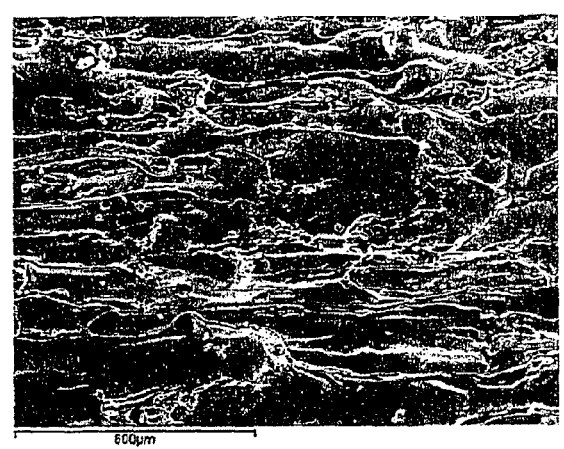

When FIG. 1 according to the invention is compared with FIG. 2 and FIG. 3 not according to the invention it is apparent that the PTFE phases (pale) are markedly smaller. With this, better homogenization has been achieved, resulting in higher mechanical strength.

The materials according to Comparative Example 1 and 2, in contrast, exhibit long and relatively large PTFE phases, especially in the direction of extrusion, and these lead to increased instability of the tapes after further processing.

FIGURES

FIG. 1: SEM image (right-hand side) and EDS image (left-hand side) of pelletized material from Inventive Example 1

FIG. 2: SEM and EDS image of pelletized material from Comparative Example 1

FIG. 3: SEM and EDS image of pelletized material from Comparative Example 2

The invention claimed is:

1. A process for producing a plastic product made of polyphenyl sulphone (PPSU) and polytetrafluoroethylene (PTFE), the process comprising:
   first extruding by mixing a mixture comprising PPSU and PTFE in a first extruder at a temperature of from 340° C. to 390° C., thereby obtaining a pellet; and
   second extruding by processing the pellet in a second extruder, thereby obtaining a plastic moulding,
   wherein the mixture comprises the PTFE in an amount of from 4.0% to 6.0% by weight and the PPSU in an amount of from 94.0% to 96.0% by weight and the PTFE has a particle size smaller than 3 μm in an amount of from 8 to 12% by volume prior to the first extruding and the PTFE has a particle size smaller than 25 μm in an amount of at least 88% by volume prior to the first extruding.

2. The process according to claim 1, wherein the PTFE has a specific surface area of from 1.5 to 3.0 m²/g.

3. The process according to claim 1, wherein the mixture comprises the PTFE in an amount of from 4.5% to 5.5% by weight and the PPSU in an amount of from 95.5% to 94.5% by weight.

4. The process according to claim 1, wherein the first extruding is extruding by mixing the PPSU and the PTFE at a temperature of from 345 to 385° C. in the first extruder at an ambient pressure of from 500 to 700 mbar, at a rotation rate of from 220 to 270 min$^{-1}$, at a screw temperature of from 340 to 390° C. and at a torque of from 50% to 80%, thereby obtaining the pellet, and the second extruding is extruding the pellet in a single-screw extruder, thereby obtaining a plastic moulding.

5. The process according to claim 1, wherein the second extruding is extruding the pellet at a screw temperature of from 345 to 390° C., thereby obtaining a plastic moulding.

6. An anti-wear tape, comprising:
   the plastic moulding obtained by the process according to claim 1.

7. A pipe for fluids, comprising:
   the anti-wear tape according to claim 6.

* * * * *